US006949945B2

(12) United States Patent
Klein

(10) Patent No.: US 6,949,945 B2
(45) Date of Patent: Sep. 27, 2005

(54) METHOD AND APPARATUS FOR MEASUREMENT OF THE WINDING TEMPERATURE OF A DRIVE MOTOR

(75) Inventor: Hans-Wilhelm Klein, Würzburg (DE)

(73) Assignee: BSH Bosch und Siemens Hausgeräte, Munich (DE)

( * ) Notice: Subject to any disclaimer, the term of this patent is extended or adjusted under 35 U.S.C. 154(b) by 0 days.

(21) Appl. No.: 10/689,420

(22) Filed: Oct. 20, 2003

(65) Prior Publication Data

US 2004/0080333 A1 Apr. 29, 2004

Related U.S. Application Data

(63) Continuation of application No. PCT/EP02/04263, filed on Apr. 17, 2002.

(30) Foreign Application Priority Data

Apr. 19, 2001 (DE) .......................................... 101 19 201

(51) Int. Cl.[7] .............................................. G01R 31/06

(52) U.S. Cl. ...................................................... 324/772

(58) Field of Search ............................. 324/772, 158.1, 324/545; 318/788–792, 749–756, 634, 641

(56) References Cited

U.S. PATENT DOCUMENTS 4,083,001 A * 4/1978 Paice ......................... 324/772
4,670,698 A 6/1987 Fulton et al.
4,829,234 A 5/1989 Gretsch
5,510,687 A * 4/1996 Ursworth et al. ........... 318/727
6,014,005 A 1/2000 Loef
6,504,358 B1 * 1/2003 Maier et al. ............. 324/158.1
6,700,400 B2 * 3/2004 Atarashi ..................... 324/772

FOREIGN PATENT DOCUMENTS

| | | |
|---|---|---|
| DE | 2 333 978 | 1/1974 |
| DE | 197 43 046 C1 | 4/1999 |
| EP | 0 247 996 A2 | 12/1987 |
| EP | 0 866 339 A1 | 9/1998 |
| GB | 1 402 874 | 8/1975 |
| JP | 62042074 A | 2/1987 |
| JP | 05316638 A | 11/1993 |

* cited by examiner

*Primary Examiner*—Vinh P. Nguyen
(74) *Attorney, Agent, or Firm*—Laurence A. Greenberg; Werner H. Stemer; Ralph E. Locher

(57) ABSTRACT

A method and a device are provided for measuring the temperature of windings of a drive motor, especially a three-phase motor, which is supplied by a converter with three controlled half bridges from a direct current intermediate circuit. The method, a corresponding device, and a control system offer more accurate results with less complicated circuit engineering. To this end, one current flux traversing at least one of the windings of the motor is measured by the converter while approximately knowing at least one cold resistance and other parameters of the motor. A temperature change of the windings is calculated from a change in the current flux based on a change of the temperature-dependent resistance.

20 Claims, 2 Drawing Sheets

METHOD AND APPARATUS FOR MEASUREMENT OF THE WINDING TEMPERATURE OF A DRIVE MOTOR

CROSS-REFERENCE TO RELATED APPLICATION

This application is a continuation of copending International Application No. PCT/EP02/04263, filed Apr. 17, 2002, which designated the United States and was not published in English.

BACKGROUND OF THE INVENTION

Field of the Invention

The present invention relates to a method for measurement of the winding temperature of a drive motor, to a corresponding apparatus, and to a control system.

Until now, temperature monitors and/or thermal protectors in the form of combined temperature sensors and switches have been used for measurement of the winding temperature, and have been disposed such that they are closely thermally coupled to the windings. Such a configuration results in the motor winding being disconnected when defined response temperatures are reached. This method requires at least one additional component of the type mentioned initially.

Furthermore, a method is known in which an equivalent value for the winding temperature is determined from the measurement of the winding current and from a time period. In such a case, for example, the product of the square of the winding current and the time $t_e$ for which the current is switched on is used as the equivalent value, corresponding to the equation $P=I^{2*}t_e$. This has the disadvantage that the method is inaccurate because tolerances and other influences can be taken into account only to a very restricted extent. This method is used, inter alia, for so-called motor circuit breakers, in which the heat produced by the current in bimetallic switches that are heated by the current flow is used to indirectly deduce the winding temperature.

A method that uses a different form of current detection necessitates special sensors to allow sufficiently accurate current mapping. In such a case, it is known, inter alia, for current sensors that operate on the basis of Hall elements to be used in a toroidal magnet core, which surrounds the conductor in which the current is intended to be measured. The current sensor is located in a connecting line to the motor winding. The detected current value is in the form of a floating signal with respect to the current itself. Currents measured using such a method can be used for determination of the winding resistance. For this purpose, the intermediate circuit voltage must be measured in addition to the current and the winding resistance or parts or a multiple of it must be determined using the equation R=U/I, taking into account the voltage drops across the control electronics. The winding temperature can be deduced from the change in the determined R values. This method can be used for motor drive electronics in which it is possible for the winding or windings to be switched on for a correspondingly short time, as in the case of converters using pulse width modulation. The current detection itself is relatively complex, due to the sensors.

SUMMARY OF THE INVENTION

It is accordingly an object of the invention to provide a method and apparatus for measurement of the winding temperature of a drive motor that overcome the hereinafore-mentioned disadvantages of the heretofore-known devices and methods of this general type and that provide more accurate results with less circuitry complexity.

With the foregoing and other objects in view, there is provided, in accordance with the invention, a method for measuring a winding temperature of a drive motor, including the steps of feeding current to motor windings of the motor through an inverter, the motor windings having a temperature-dependent resistance, measuring, through the inverter, a current flow through at least one of the motor windings with at least approximate knowledge of a cold resistance and other parameters of the motor, calculating a change in temperature of the motor windings from a change in the current flow resulting from a change in the temperature-dependent resistance, and measuring one of a rise time of the current until at least one reference value is reached and a current rise during a fixed time interval.

A method according to the invention for measurement of the winding temperature is based on the use of known circuits. German Published, Non-Prosecuted Patent Application DE 2 333 978 A discloses the use of a bridge circuit for controlling the rotation speed of induction motors, in which case the bridge circuit can be controlled through semiconductor elements and uses a DC voltage intermediate circuit to form a three-phase alternating current for feeding a three-phase motor, with three winding sections. This principle and the use of corresponding circuits have been proven. For example, in principle, European Patent Application EP 0 866 339 A1, corresponding to U.S. Pat. No. 6,014,005 to Loef discloses a method and a circuit configuration that build on such a circuit, in which method the motor currents are determined by a special evaluation process from current measurements in the parallel branches of a polyphase inverter to supply these motor currents as actual values to a closed-loop motor rotation speed control system.

The invention is also based on the knowledge that a load that lasts for a short time cannot lead to overheating of a motor because every motor has a high thermal capacity. According to the invention, temperature monitoring is carried out by measurement of the winding resistances of the regulated motor, by comparison of a value of a respective cold resistance with an instantaneous resistance when warmed up.

In one major development of the invention, measurements are not carried out continuously in the course of long-term monitoring. Long-term monitoring that also need not be carried out continuously but can be carried out at discrete times is, thus, sufficient for effective protection against overheating of the motor. This measurement method is also matched in a particular way to the actual operating conditions of modern motors. Particularly in household appliances, such as washing machines, spin dryers etc., as laundry apparatuses with relatively high motor ratings, the motors do not run continuously at the same rotation speed and in the same direction. In fact, the rotation directions change to produce a specific washing action and to improve the distribution of the laundry within a washing drum, as well to reduce any unbalance. Short pauses or stationary phases occur repeatedly in the course of the changing rotation directions, during which no current flows through the motor, either. These pauses are actually, preferably, used for measurement of an instantaneous value of the winding resistances.

In principle, with accurate knowledge of the cold resistance and of the other material parameters, it is possible to deduce the temperature of the motor windings from a resistance measurement through the converter. Consequently, a circuit that already exists just has to carry out an additional task during brief time periods, controlled by a control that is, likewise, present in any case. This method can also be carried out, optionally, based upon a current and voltage measurement while the motor is running.

In accordance with another mode of the invention, the time is measured from the state in which no current is flowing to the point at which a current threshold value is reached when a measurement voltage is applied, preferably, the intermediate circuit voltage. This measurement time prior to the response of a threshold value switch or comparator is shortened by an increase in the total resistance resulting from heating of the winding and the extent of such a shortening can clearly be measured.

In accordance with a further mode of the invention, measurements of the current values through the motor are carried out a few times while the current flow is rising.

In such a case, the interval between the two measurement times is fixed. Once again, if the curve profile is, in principle, known, it is possible to calculate a resistance change and, hence, a temperature increase.

The measurement values are advantageously stored so that successive values can be compared with one another to make it possible to detect a change in the winding temperature. Even a situation in which an instantaneous winding temperature is gradually approaching a critical temperature range is, thus, also measured sufficiently early so that the motor controller can take suitable measures to ensure cooling down, but at least to counteract any further rise in the instantaneous winding temperature. A simple way of achieving such a result is merely to reduce the time for which the motor is switched on. Furthermore, a signal should be emitted to a user so that it is possible, by monitoring the supply paths for fresh air, to overcome thermal problems and to eliminate the need to increase the program running time as is initiated automatically according to the invention to protect the motor. From experience, dust accumulations, blocked, or poorly maintained filters, or else an object that is accidentally covering the supply paths for fresh air lead to greatly increased motor temperatures can be corrected easily and quickly but that would lead to the motor failing for thermal reasons in a short time without the use of a protection mechanism according to the invention.

The cold resistance of the motor windings and other motor parameters can be measured once on installation, and may be permanently stored in an apparatus for temperature monitoring. In the case of relatively large production batches, discrepancies of up to about 5% are, however, acceptable, so that, in this case, it is also possible to use fixed predetermined standard values, for cost reasons. Further approximations will be described in the following text in conjunction with the description of an exemplary embodiment.

In addition to pure temperature monitoring, it is also possible to monitor the current flowing to the converter. This is done by defining two measurement thresholds, an initial warning threshold and an emergency disconnection threshold, which is located above the former, in a current evaluation circuit. In such a case, the current evaluation circuit may, for example, use the voltage drop in the shunt that is common to all the half bridges of the converter in every operating mode, that is to say, even while the motor is running, without any adverse effect.

In accordance with an added mode of the invention, the measuring step is carried out simultaneously through two windings of the motor.

In accordance with an additional mode of the invention, the measuring step carried out to determine any relative discrepancy.

In accordance with yet another mode of the invention, measurement results of previous measurements are stored.

In accordance with yet a further mode of the invention, an acknowledgement is passed to a motor controller to reduce operating phases of the motor.

In accordance with yet an added mode of the invention, a signal to a user is initiated from a motor controller. Preferably, the signal is a visual signal and/or an audible signal.

With the objects of the invention in view, there is also provided a method for measuring a winding temperature of a drive motor, including the steps of providing the drive motor with three winding sections, the motor windings having a temperature-dependent resistance, providing an inverter with three controlled half bridges, feeding current from a DC voltage intermediate circuit through an inverter to the motor windings, measuring, through the inverter, a current flow through at least one of the motor windings with at least approximate knowledge of a cold resistance and other parameters of the motor, calculating a change in temperature of the motor windings from a change in the current flow resulting from a change in the temperature-dependent resistance, and measuring one of a rise time of the current until at least one reference value is reached and a current rise during a fixed time interval.

With the objects of the invention in view, there is also provided an apparatus for measuring a winding temperature of a drive motor having motor windings, the motor windings having a temperature-dependent resistance, including an inverter for feeding current to the motor windings, a current measurement device, a voltage measurement device, a computation unit connected to the current measurement device and to the voltage measurement device for determining an instantaneous resistance of the motor windings, the computation unit being programmed to determine one of a temperature change and a temperature of the windings based upon one of the instantaneous resistance and an instantaneous change in the temperature-dependent resistance, and at least one of at least one threshold value comparator and one time measurement apparatus and the current measurement device measuring in a defined time interval and for passing on an analog or a digital signal to an evaluation device.

In accordance with yet an additional feature of the invention, there is also provided a microcontroller, the computation unit being part of the microcontroller.

In accordance with again another feature of the invention, the computation unit is part of a microcontroller.

In accordance with again a further feature of the invention, the threshold value comparator and the time measurement apparatus are part of the microcontroller.

In accordance with again an added feature of the invention, the evaluation device is the computation unit and is part of the microcontroller.

In accordance with again an additional feature of the invention, the evaluation device is a computation unit and is part of the microcontroller.

In accordance with still another feature of the invention, there are also provided two threshold value comparators for monitoring two current thresholds, one of the current thresholds being above a control current limit of a pulse width modulation for controlling circuit breakers for one of a converter and the inverter, a value of the first threshold being approximately 60% of that of the second threshold, and one of the microcontroller and a downstream control unit being programmed to immediately initiate emergency disconnection of the motor 1 upon reading the second threshold.

With the objects of the invention in view, there is also provided an apparatus for measuring a winding temperature of a three-phase drive motor having motor windings, the motor windings having a temperature-dependent resistance, an inverter having three controlled half bridges feeding current to the motor windings from a DC voltage intermediate circuit, including a current measurement device, a voltage measurement device, a computation unit connected to the current measurement device and to the voltage measurement device for determining an instantaneous resistance of the motor windings, the computation unit being programmed to determine one of a temperature change and a temperature of the windings based upon one of the instantaneous resistance and an instantaneous change in the temperature-dependent resistance, and at least one of at least one threshold value comparator and one time measurement apparatus and the current measurement device measuring in a defined time interval and for passing on an analog or a digital signal to an evaluation device.

With the objects of the invention in view, in a motor system including DC voltage intermediate circuit, a three-phase drive motor with motor windings, the motor windings having a temperature-dependent resistance, and an inverter having three controlled half bridges feeding current to the motor windings from the intermediate circuit, there is also provided a winding temperature measuring apparatus including a current measurement device, a voltage measurement device, a computation unit connected to the current measurement device and to the voltage measurement device for determining an instantaneous resistance of the motor windings, the computation unit being programmed to determine one of a temperature change and a temperature of the windings based upon one of the instantaneous resistance and an instantaneous change in the temperature-dependent resistance and at least one of at least one threshold value comparator and one time measurement apparatus and the current measurement device measuring in a defined time interval and for passing on an analog or a digital signal to an evaluation device.

With the objects of the invention in view, there is also provided a household appliance, including a drive motor having motor windings, the motor windings having a temperature-dependent resistance, an inverter for feeding current to the motor windings, an control system for measuring a winding temperature of the drive motor, the apparatus having a current measurement device measuring, through the inverter, a current flow through at least one of the motor windings with at least approximate knowledge of a cold resistance and other parameters of the motor, the current measurement device measuring one of a rise time of the current until at least one reference value is reached and a current rise during a fixed time interval, a voltage measurement device, a computation unit connected to the current measurement device and to the voltage measurement device for determining an instantaneous resistance of the motor windings, the computation unit being programmed to determine one of a temperature change and a temperature of the windings based upon one of the instantaneous resistance and an instantaneous change in the temperature-dependent resistance and to calculate a change in temperature of the motor windings from a change in the current flow resulting from a change in the temperature-dependent resistance, and at least one of at least one threshold value comparator and one time measurement apparatus and the current measurement device measuring in a defined time interval and for passing on an analog or a digital signal to an evaluation device.

A method according to the invention and a corresponding apparatus advantageously provide new capabilities for simple and reliable temperature monitoring for electric motors of any desired type and drive configuration. According to the invention, no sensors and no additional analog current temperature detection are required. Furthermore, there is no need for any changes to or intervention in the electric motor itself because a method according to the invention provides an indirect measurement and is carried out entirely in the area of a power converter. Furthermore, there is no need to provide any additional cables between the electric motor and the power converter, either.

Other features that are considered as characteristic for the invention are set forth in the appended claims.

Although the invention is illustrated and described herein as embodied in a method and apparatus for measurement of the winding temperature of a drive motor, it is, nevertheless, not intended to be limited to the details shown because various modifications and structural changes may be made therein without departing from the spirit of the invention and within the scope and range of equivalents of the claims.

The construction and method of operation of the invention, however, together with additional objects and advantages thereof, will be best understood from the following description of specific embodiments when read in connection with the accompanying drawings.

DESCRIPTION OF THE PREFERRED EMBODIMENTS

Figure 1:
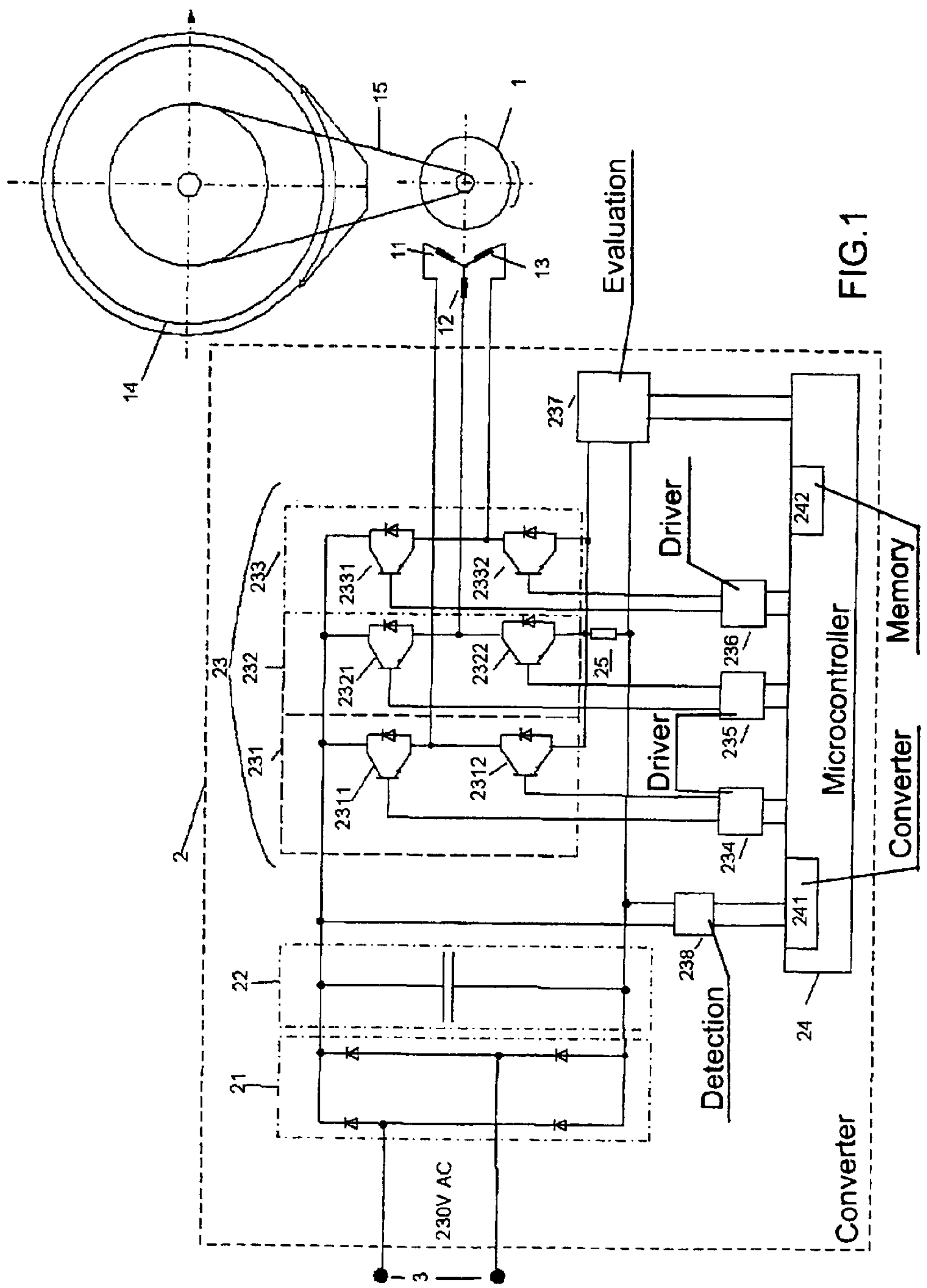
FIG. 1 is a block and schematic circuit diagram of a system according to the invention.

Referring now to the figures of the drawings in detail and first, particularly to FIG. 1 thereof, there is shown an apparatus for carrying out a method according to the invention using an asynchronous motor 1 that is connected to a power supply system voltage 3 through a converter 2. Apart from providing control during normal motor operation, the circuit configuration that is described in the following text detects winding resistances such that a change in these winding resistances can be used to determine an instantaneous winding temperature based upon a formula that is derived in the following text. In such a case, a method according to the invention is based on a circuit configuration that is known from the prior art. This represents an advantageous extension to the monitoring of the winding temperature of the motor 1, which can be used immediately, with little additional costs, in widely differing drives, that is to say, not only for asynchronous motors with belt drives, but also for synchronous motors in direct drives etc.

The converter 2 has, inter alia, a rectifier 21 that supplies a DC voltage intermediate circuit 22 from an AC voltage power supply system 3. A three-phase inverter 23 is operated from the intermediate circuit 22, and substantially includes three half bridges 231, 232, 233, which, in turn, each have two switches in the form of power semiconductors 2311, 2312, 2321, 2322, 2331, 2332 and associated drivers 234, 235, 236. The voltage from the intermediate circuit is connected to three star-connected windings 11, 12, 13 of the asynchronous motor 1 through the half bridges 231, 232, 233 by pulse width modulation, which is referred to for short in the following text as PWM. Sinusoidal motor currents are produced by a sinusoidally weighted PWM method. In such a case, the required pulse patterns are produced by a microcontroller 24 and are preset for the power switches 2311, 2312, 2321, 2322, 2331, 2332 through the drivers 234, 235, 236.

Furthermore, a current detection circuit 25 and a current evaluation circuit 237 are provided. A detection circuit 238 is, likewise, required for the intermediate circuit voltage. Both detection circuits are connected to the microcontroller 24, which calculates the winding resistance, which chain and, from this, determines the winding temperature. The current detection circuit 25 in the present embodiment is connected in the form of a shunt 25 in the connecting line between the negative pole of the intermediate circuit 22 and the inverter 23, and, thus, detects the entire current through the motor 1. The current evaluation circuit 237 substantially includes a comparator circuit, which compares a current value with a reference value. When a reference value is reached, a status change takes place in a binary signal to complete a time measurement, whose result is evaluated by the microcontroller 24 using a formula that will be derived in detail in the following text.

The intermediate circuit voltage is detected as an analog value in the detection circuit 238 by a voltage divider, and is read to the microcontroller 24 through an analog/digital converter or A/D converter 241. In this case, the A/D converter 241 may, in a known manner, be an integral part of the microcontroller 24, in the same way as the current evaluation circuit 237 and other components of the described apparatus. However, the individual devices may also be in discrete form, so there is no need to change or upgrade an already existing microcontroller 24.

One precondition for the detection of the winding resistance is that the winding time constant $\tau$ is known. However, this does not represent any additional requirements for use of this circuit with one specific motor type because characteristic variables and motor parameters such as these have to be known in any case for rotation speed regulation. In this case, these parameters are stored in the microcontroller 24, or in the memory module 242 associated with it. In the situation as described here of a configuration for batch production or mass production, manufacturing tolerances can be ignored. The relative evaluation of the winding resistances as described in the following text, that is to say, detection only of changes to the respective values, means that it is irrelevant whether a winding resistance or, as described here, two series-connected winding resistances is or are now evaluated. At least two semiconductor switches must be switched on for the measurement, whose voltage drops are, likewise, ignored in comparison to the intermediate circuit voltage because they amount to a maximum of only about 2% of the intermediate circuit voltage and their changes with temperature are only fractions of these values. Furthermore, the shunt resistance 25 can be ignored in comparison to the winding resistances. It is also assumed that magnetic saturation influences prior to reaching a current reference value are, likewise, negligible.

The measurement procedure for a first embodiment is as set forth in the following text.

When the motor 1 is stationary, one switching transistor in each of two different half bridges, for example, 2311 and 2322 in the half bridges 231 and 232, respectively, is switched on by a pulse pattern that is predetermined by the microcontroller 24 so that a current i flows through the two motor windings 11, 12, corresponding to the assumed star connection of the asynchronous motor winding of the motor 1. Due to the relatively low resistance of the windings and semiconductors in this circuit, the current level and a voltage value produced in consequence across the shunt 25 will reach a reference value $i_{ref}$ for the evaluation circuit 237 in a short time $t_1$. The signal change initiated by this is evaluated by the microcontroller 24, and the drive for the switching transistors 2311 and 2322 mentioned above is switched off so that the intermediate circuit voltage is disconnected from the windings 11, 12 of the motor 1. The time $t_1$ is now a measure of the magnitude of the current flow. Once this time $t_1$ has been measured, the intermediate circuit voltage U is, in each case, evaluated by the microcontroller 24 through the voltage divider 238 for tapping off the intermediate circuit voltage and the A/D converter 241. This allows the following calculation variables to be determined:

$$i_{ref} = \frac{U}{R}(1 - e^{-t1/\tau}) \tag{1}$$

The change in the winding resistance can be obtained from this as follows:

$$\Delta R = \frac{U}{i_{ref}}(1 - e^{-t1/\tau}) - R_{20},$$

where:

$t_1$=time from switching on to reaching a measurement time;

$\tau$=winding time constant L/R;

$i_{ref}$=reference value of the winding current;

U=intermediate circuit voltage; and

R=instantaneous winding resistance.

The winding resistance can, now, always be determined during pauses in rotation, that is to say, when the motor is stationary, in order to detect the mean temperature increase in the winding.

Where:

$R_{20}$=cold resistance or reference resistance; and $k_p$=proportionality factor, the temperature change $\Delta T$ for the determined resistance values can be calculated as follows:

$$R = R_{20}(1 + {}^*k_p{}^*\Delta T).$$

Finally, this results in the temperature change $\Delta T$ as:

$$\Delta T = \frac{R - R_{20}}{R_{20} * k_p} \tag{2}$$

Figure 2:
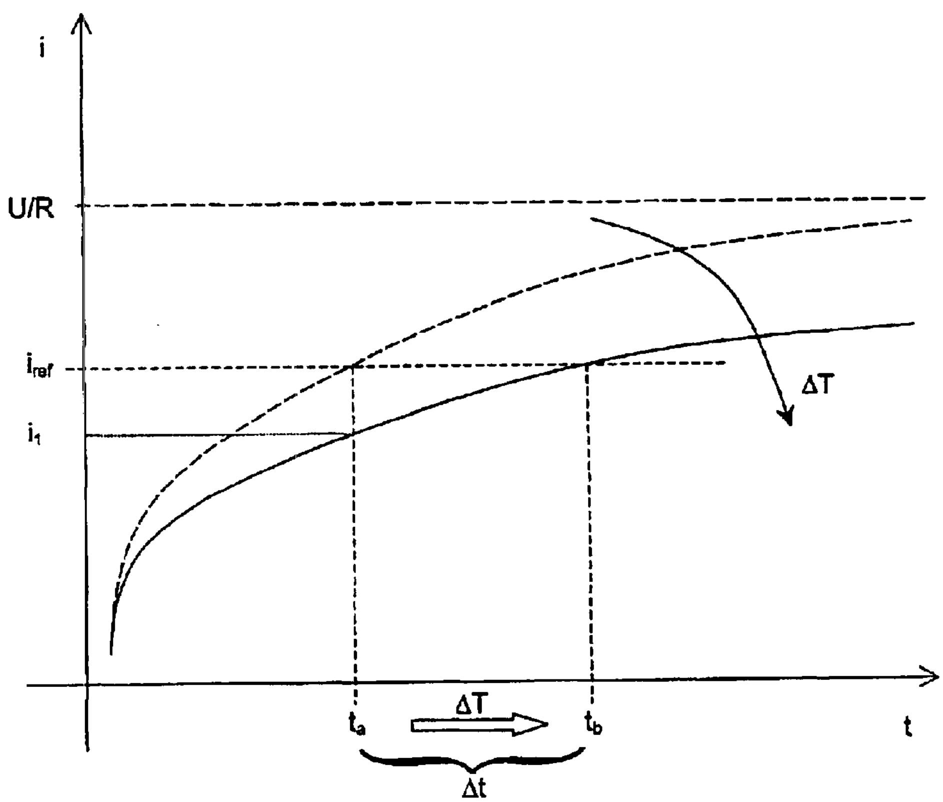
FIG. 2 is a graph illustrating a basic time profile of the temperature-dependent resistance of a motor winding.

The graph in FIG. 2 illustrates the basic time profile of the temperature-dependent resistance of a motor winding. The curve of the current rise has a different gradient, in accordance with the equation (1), depending on the heating of the winding. In this case, overall, the winding behaves as a positive temperature coefficient resistor, that is to say, the resistance of the winding increases, in a manner that can be measured easily, as the temperature rises. In consequence, a threshold value $i_{ref}$ will always be reached later when the winding is relatively cool than when the winding has been heated further. It is, thus, very important to determine relatively accurately this time difference between the start of the current measurement and the point at which the threshold value is reached.

A second embodiment is based on knowledge of the curve shape and of its parameters, as well as of the temperature influences described above on the curve profile. Starting from a defined current value (in this case, once again, the current value 0, which is associated with the motor 1 when it is stationary) the rise in the current flow is observed when a voltage is applied, preferably, the known intermediate circuit DC voltage through the voltage divider 238 and the A/D converter 241 in the microcontroller 24. Two current measurements, which follow one another at a time interval Δt that is known accurately, in this way allow the winding heating to be determined from the curve profile through the instantaneous winding resistance. The time measurement is less critical for this method because only one fixed time interval Δt can be predetermined, as well. In such a case, the accuracy of the indirect temperature determination in fact depends on the quality of the two current measurements to be carried out.

In both methods, the current load on the winding resulting from the measurement current when the motor is stationary in any case is of such a short duration that this does not, itself, cause any measurable change to the winding temperature. Furthermore, in both methods, the value of the temperature change ΔT can be compared with a maximum value $T_{max}$ or with an absolute value T', using equation (2), depending on the configuration and design of an evaluation circuit within the microcontroller 24.

Measurement methods of the type described above can sensibly be used, in particular, when it is possible to dispense with complex current detection, such as that used for field-oriented regulation of asynchronous motors. One example of use that may be mentioned is the drum drive for a washing machine, in which the motor 1 drives the washing drum 14 through a pulley belt 15. It is particularly important to monitor the temperature in the washing machine during a washing process because a high torque and, thus, a high current load as well occur in this case. Furthermore, in such an operating situation, the motor 1 runs at a slow rotation speed so that only a small amount of cooling is provided as well. The situation during spin drying, in contrast, is considerably better because, in such a case, the drive torque and, hence, the electrical heat that is produced as well are decreased, with the rotation speed being considerably higher.

Because, in addition, inadequate cooling can also lead to an overcurrent when the winding temperatures are raised, the current i is measured or monitored in a third embodiment, which can, at the same time, be combined with one of the two measurement methods described above. This is done by the current evaluation circuit 237 evaluating the return current flow from the inverter 23 during operation of the motor 1. This monitoring can be carried out on its own as a current measurement in the current evaluation circuit 237, or, else, in the form of a voltage drop across the shunt 25. To simplify the method to a major extent, the monitoring is carried out through two window comparators, using two different threshold values. Such a comparator, therefore, does not pass on any analog signals, but only a digital switching signal. The first threshold is somewhat above the PWM control current limit. When the inverter 23 is operating correctly, such current load is generally not reached. The value of the first threshold is approximately 60% of that of the second threshold, which also defines the current overload point. When the second threshold is reached, the microcontroller 24 or a downstream control unit, thus, carries out an emergency disconnection of the motor 1, immediately.

I claim:

1. A method for measuring a winding temperature of a drive motor, which comprises:

feeding current to motor windings of the motor through an inverter, the motor windings having a temperature-dependent resistance;

measuring, through the inverter, a current flow through at least one of the motor windings with at least approximate knowledge of a cold resistance and other parameters of the motor;

calculating a change in temperature of the motor windings from a change in the current flow resulting from a change in the temperature-dependent resistance; and measuring one of:

a rise time of the current until at least one reference value is reached; and a current rise during a fixed time interval.

2. The method according to claim 1, which further comprises carrying out the measuring step when the motor is stationary.

3. The method according to claim 1, which further comprises carrying out the measuring step simultaneously through two windings of the motor.

4. The method according to claim 2, which further comprises carrying out the measuring step simultaneously through two windings of the motor.

5. The method according to claim 1, which further comprises carrying out the measuring step to determine any relative discrepancy.

6. The method according to claim 1, which further comprises storing measurement results of previous measurements.

7. The method according to claim 1, which further comprises passing an acknowledgement to a motor controller to reduce operating phases of the motor.

8. The method according to claim 7, which further comprises initiating a signal to a user from a motor controller.

9. The method according to claim 8, which further comprises carrying out the initiating step by initiating at least one of a visual signal and an audible signal.

10. A method for measuring a winding temperature of a drive motor, which comprises:

providing the drive motor with three winding sections, the motor windings having a temperature-dependent resistance;

providing an inverter with three controlled half bridges;

feeding current from a DC voltage intermediate circuit through an inverter to the motor windings; measuring, through the inverter, a current flow through at least one of the motor windings with at least approximate knowledge of a cold resistance and other parameters of the motor;

calculating a change in temperature of the motor windings from a change in the current flow resulting from a change in the temperature-dependent resistance; and measuring one of:

a rise time of the current until at least one reference value is reached; and a current rise during a fixed time interval.

11. An apparatus for measuring a winding temperature of a drive motor having motor windings, the motor windings having a temperature-dependent resistance, comprising:

an inverter for feeding current to the motor windings; a current measurement device;

a voltage measurement device; a computation unit connected to said current measurement device and to said voltage measurement device for determining an instantaneous resistance of the motor windings, said computation unit being programmed to determine one of a temperature change and a temperature of the windings based upon one of the instantaneous resistance and an instantaneous change in the temperature-dependent resistance; and at least one of:

at least one threshold value comparator and one time measurement apparatus; and said current measurement device measuring in a defined time interval and for passing on an analog or a digital signal to an evaluation device.

12. The apparatus according to claim 11, further comprising a microcontroller, said computation unit being part of said microcontroller.

13. The apparatus according to claim 11, wherein said computation unit is part of a microcontroller.

14. The apparatus according to claim 12, wherein said threshold value comparator and said time measurement apparatus are part of said microcontroller.

15. The apparatus according to claim 12, wherein the evaluation device is said computation unit and is part of said microcontroller.

16. The apparatus according to claim 12, wherein the evaluation device is a computation unit and is part of said microcontroller.

17. The apparatus according to claim 12, further comprising:

two threshold value comparators for monitoring two current thresholds;

one of said current thresholds being above a control current limit of a pulse width modulation for controlling circuit breakers for one of a converter and said inverter;

a value of said first threshold being approximately 60% of that of said second threshold; and one of said microcontroller and a downstream control unit being programmed to immediately initiate emergency disconnection of the motor upon reading said second threshold.

18. An apparatus for measuring a winding temperature of a three-phase drive motor having motor windings, the motor windings having a temperature-dependent resistance, an inverter having three controlled half bridges feeding current to the motor windings from a DC voltage intermediate circuit, comprising:

a current measurement device; a voltage measurement device;

a computation unit connected to said current measurement device and to said voltage measurement device for determining an instantaneous resistance of the motor windings, said computation unit being programmed to determine one of a temperature change and a temperature of the windings based upon one of the instantaneous resistance and an instantaneous change in the temperature-dependent resistance; and at least one of:

at least one threshold value comparator and one time measurement apparatus; and said current measurement device measuring in a defined time interval and for passing on an analog or a digital signal to an evaluation device.

19. In a motor system including DC voltage intermediate circuit, a three-phase drive motor with motor windings, the motor windings having a temperature-dependent resistance, and an inverter having three controlled half bridges feeding current to the motor windings from the intermediate circuit, a winding temperature measuring apparatus comprising:

a current measurement device; a voltage measurement device;

a computation unit connected to said current measurement device and to said voltage measurement device for determining an instantaneous resistance of the motor windings, said computation unit being programmed to determine one of a temperature change and a temperature of the windings based upon one of the instantaneous resistance and an instantaneous change in the temperature-dependent resistance; and at least one of:

at least one threshold value comparator and one time measurement apparatus; and said current measurement device measuring in a defined time interval and for passing on an analog or a digital signal to an evaluation device.

20. A household appliance, comprising:

a drive motor having motor windings, said motor windings having a temperature-dependent resistance;

an inverter for feeding current to said motor windings;

an control system for measuring a winding temperature of said drive motor, said apparatus having:

a current measurement device measuring, through said inverter, a current flow through at least one of said motor windings with at least approximate knowledge of a cold resistance and other parameters of said motor, said current measurement device measuring one of:

a rise time of the current until at least one reference value is reached; and a current rise during a fixed time interval;

a voltage measurement device;

a computation unit connected to said current measurement device and to said voltage measurement device for determining an instantaneous resistance of said motor windings, said computation unit being programmed to determine one of a temperature change and a temperature of said windings based upon one of the instantaneous resistance and an instantaneous change in the temperature-dependent resistance and to calculate a change in temperature of the motor windings from a change in the current flow resulting from a change in the temperature-dependent resistance; and at least one of:

at least one threshold value comparator and one time measurement apparatus; and said current measurement device measuring in a defined time interval and for passing on an analog or a digital signal to an evaluation device.

* * * * *